Dec. 9, 1969  R. R. MURRAY ET AL  3,482,423
BLADE PEENING MASKING APPARATUS
Filed Feb. 26, 1968  5 Sheets-Sheet 1

INVENTORS
ROBERT R. MURRAY
GLEN D. SMITH
BY
Kane, Dalsimer, Kane, Sullivan and Smith
ATTORNEYS Dec. 9, 1969  R. R. MURRAY ET AL  3,482,423
BLADE PEENING MASKING APPARATUS
Filed Feb. 26, 1968  5 Sheets-Sheet 3

INVENTORS
ROBERT R. MURRAY
GLEN D. SMITH
BY
Kane, Dalsimer, Kane, Sullivan & Smith
ATTORNEYS United States Patent Office 3,482,423
Patented Dec. 9, 1969

3,482,423
BLADE PEENING MASKING APPARATUS
Robert R. Murray, Thompsonville, and Glenn D. Smith, Simsbury, Conn., assignors to Metal Improvement Company, Carlstadt, N.J., a corporation of New Jersey
Filed Feb. 26, 1968, Ser. No. 708,367
Int. Cl. B21j 3/00
U.S. Cl. 72—53            16 Claims

ABSTRACT OF THE DISCLOSURE

This invention is directed to peening apparatus, particularly adapted for peening turbine blades. Provisions are made for peening the blade structure initially with its edges covered and for peening the blade structure with the protective covering removed prior to finalization of the peening operation. The protective component is usually in the form of a pliable material.

---

This invention relates to peening apparatus and protective arrangements used therewith.

A protective or shrouding arrangement is particularly important when the peened article is constituted by a set of turbine blades. Provisions are made by this invention for protecting particularly the leading and trailing edges of the blades from intense peening action during a substanital portion of the peening operation which the blades, as a whole, undergo in treatment prior to finishing.

As an illustration of the invention, consideration will be given to turbine constructions wherein, particularly on the stator elements, a substantial number of blades extend between an outer rim and an inner ring, between which they are held in secured position. To provide strength for the blade and to improve the blade contour particularly, it is usually desirable to direct peening components against and over the blade face from each side. The peening components may be included in a slurry directed from a peening nozzle (usually of the so-called "duck bill" variety) into which the slurry is fed in one portion and into another portion of which fluid, such as air under pressure above atmosphere, is fed to force the slurry outwardly toward the blade structure itself. In other forms, the blades are peened by directing hardened shot elements also by fluid jets against the blades. The peening tends to toughen the outer surface of the blade structure and, in addition and to at least a minor extent, to aid in shaping the blade structure to precisely that desired.

In one form of the peening apparatus, as shown particularly in companion application of Harold W. Burney, Walter J. Bissinger and Raymond W. Lozier and entitled "Blade Peening Apparatus" Ser. No. 708,442, filed Feb. 26, 1968 there has been illustrated a cabinet within which one form of a blade peening operation occurs. This particular invention is directed primarily to the actual blade mounting within the structure of the outer support frame and an inner ring for securing the blade structure as it is subjected to the peening components.

In the concurrently filed patent application above referred to, the turbine stator element is positioned upon a shaft extending through a panel member. The panel member, which at times is termed an "indexing door," is capable of being rotated through an angle of 360°, with rotation then being capable of being stopped at any intermediate angle and then repeated. The operation usually occurs by supporting the component to be peened upon the shaft on one side of the panel or door and then turning the panel or door through an angle of 180° so that the panel itself forms a closure element or door of the cabinet within which the peening operation is to take place. One side of the panel is thus left free for access and work handling so that previously peened articles can be removed and articles to be peened in the future can replace them. Numerous peening jets or nozzles are positioned within the cabinet which is closed by one or the other side of this panel. The jets are arranged so that the released peening components are directed against the supported work within the cabinet from at least two sides. For rapidity of operation, multiple jets are usually used with the peening operation at any moment covering a selected portion of the total surface area of the article which is to be treated. The peening nozzles or jets make a selected number of traversals of a portion of the work-piece to be peened after which, as explained in the mentioned copending application, the work position is changed to bring a new section into the range of the peening jets. In many instances the work held on the door or panel is rotated continuously at a relatively slow rate so that the entire operation continues until the complete set of blades is peened. The panel or door is generally locked closed in the latter condition and then, after the nozzle jet assembly has made a pre-selected number of reciprocations (gauged by the rotational rate of the work) an indexing mechanism releases the door or panel for turning. It is at this time that a finished work-piece can be removed and another work-piece (previously mounted on the opposite side of the door) can be moved to a peening position.

The components to be peened which are held upon the support spindle or shaft extending through the panel are usually removably fastened to this shaft on an appropriate arbor so as to be suspended in cantilever fashion at a selected distance from the panel face. While not the subject of this invention, the foregoing description of the peening jets reciprocated relative to the work and the replacement of new work after a selected number of relative movements of the jet to the work component treated will be helpful to a full understanding, although dealt with in the mentioned companion application.

It has been found convenient, particularly in connection with the peening of blades for turbines, such as the blades of a turbine constituing portions of the jet engine structure for an aircraft, to treat each blade with a peening operation wherein the peening slurry is first directed against the blade surface at a relatively high velocity. This peening slurry comprises usually a selected concentration of water and small but hard and generally uniform size objects. Most frequently, the objects which perform the peening operation are in the form of glass beads or balls of minute size. In most instances, these beads are of a size range from approximately a diameter of 0.001" to one of about 0.033".

It is possible also to use as the peening element other components such as steel balls or tungsten carbide balls or other hard objects, but in blade treatment work these usually are not preferred. Whatever objects are used, the peening elements should be such that there is minimum breakage and shape change, as by chipping, so that a maximum amount of work is done per unit time period.

Glass beads or balls of the size suggested can be acquired very cheaply. They are almost usually of practically uniform size and because of small diameter component selected they are usually regarded as preferable for the chosen operation. Any peening operation effective on even hardened steel blades, such as tungsten steel, has a general cutting or erosion effect.

Thus, a blade structure, which tends to be thinner at its leading and trailing edge than in its center, would be peened to an extremely sharp edge if permitted to be subjected to the peening operation throughout the entire time period of treatment of the remainder of the blade. To avoid his effect, this invention makes provision for masking or protecting the leading and trailing edges of the blades for a portion of the time while the peening operation is proceeding at one rate and at one selected peening velocity. Following the selected period of peening, the invention makes provision for rapidly removing the blade protective medium or shroud components from the trailing and leading edges of the blade so that the entire blade structure may then be peened, usually at a lower velocity of the impacting jet of peening slurry or dry elements.

The protective component when so positioned lengthwise of the blade and along its leading and trailing edge is such that it generally has the effect of shadowing the blade structure proper and thus, in this way, also precluding any peening action. The protective component is usually in the nature of some form of tough, yet flexible, thermoplastic resinous material which has substantial strength and yet is softer than the blade structure itself so that the impacting peening components tend to lose their hardness and are even reflected from this protective covering, whereas if impacting the hardened surface of the blade itself, all of the energy of the impacting jet must be absorbed immediately by the blade structure itself as contrasted to that absorption which is provided by the more or less resilient protective component. To this end, various forms of structures for protecting the edges of the blades are described and provided by this invention.

In one form, metal rods having a bonded covering of a plastic are positioned in the path of the stream from the peening jets to the blades in such a way that direct impact on the blade edges of any ejected components from the peening nozzles is precluded. In other forms, the protective components are in the form of a plastic rod which generally will seem hard to the human touch but, as compared to the hardness of the blade to be treated, actually is soft and pliable. Such components often have a longitudinal notch into which the leading or trailing edge of the blades to be peened are positioned for a portion of the operating time. In still other forms, the protective component is in the form of a rather heavy plastic tube having a slot cut therein for positioning over either or both the leading and trailing edges of the blades. Various other forms of structures may be provided within the teachings of this invention.

The important feature is that the protective components shall be capable of being positioned in a protective shrouding fashion relative to the blades to be treated and removed from the protective position almost instantaneously by a quick release component secured to a part of the arbor on which the blade structure as a whole is supported for the controlling operation. The removal may take place following one portion of the peening operation where all peening is maintained generally at the same velocity, and at approximately or the same concentration of peening components. Then, after the component has been peened, it may be replaced and the peening operation restarted with the components removed or, in the alternative, the protective components may be removed by an opening of the panel door and a quick release of the protective elements prior to finishing the peening operation at the lower velocity.

Matters of this latter type are purely arbitrary and selective and per se do not constitute any significant portion of this invention. The invention, as herein to be described, has as one of its main objects that of providing protective components for shielding the front and rear edges of turbine blades during a portion of a peening operation when the main blade structure is to be treated, and then to have this protective structure capable of being rapidly removed at a later time so that the entire blade structure may be treated to form the finished component.

Other objects of the invention are those of providing a structure which is easy to install and in which the wear feature is good and which is readily and easily arranged for positioning with respect to turbine blade components.

Still other objects and advantages will naturally suggest themselves from a consideration of the following description and claims in connection with the accompanying drawings wherein

FIGS. 4, 5 and 6 are intended to show sections through masking or shrouding components for protecting or shadowing either or both the front and back blade edges from the path of the jet stream during at least a part of the peening operation. In these figures.

Figure 1:
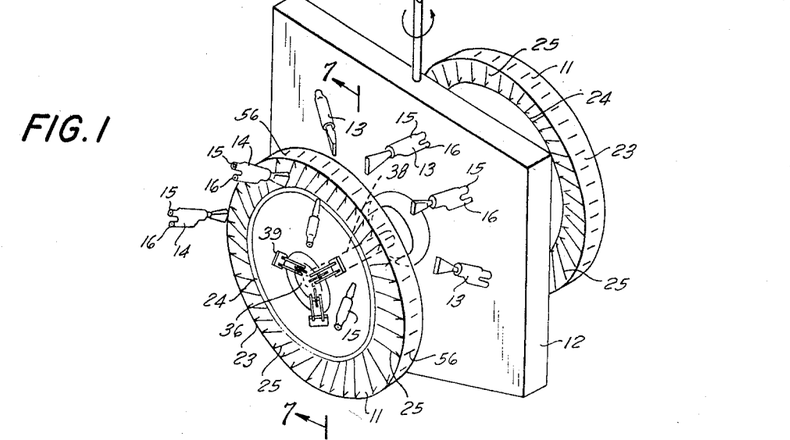
FIG. 1 is generally an environmental view to show an arrangement of a turbine stator element positioned for peening and held upon a panel structure which is adapted to form a closure element of a cabinet within which peening occurs. The figure shows, looking from left to right, the blade-holding stator element as it would be positioned interiorly of the cabinet with a portion of either a finished article or a new article to be peened shown to the right side of the panel.
Figures 7, 8:
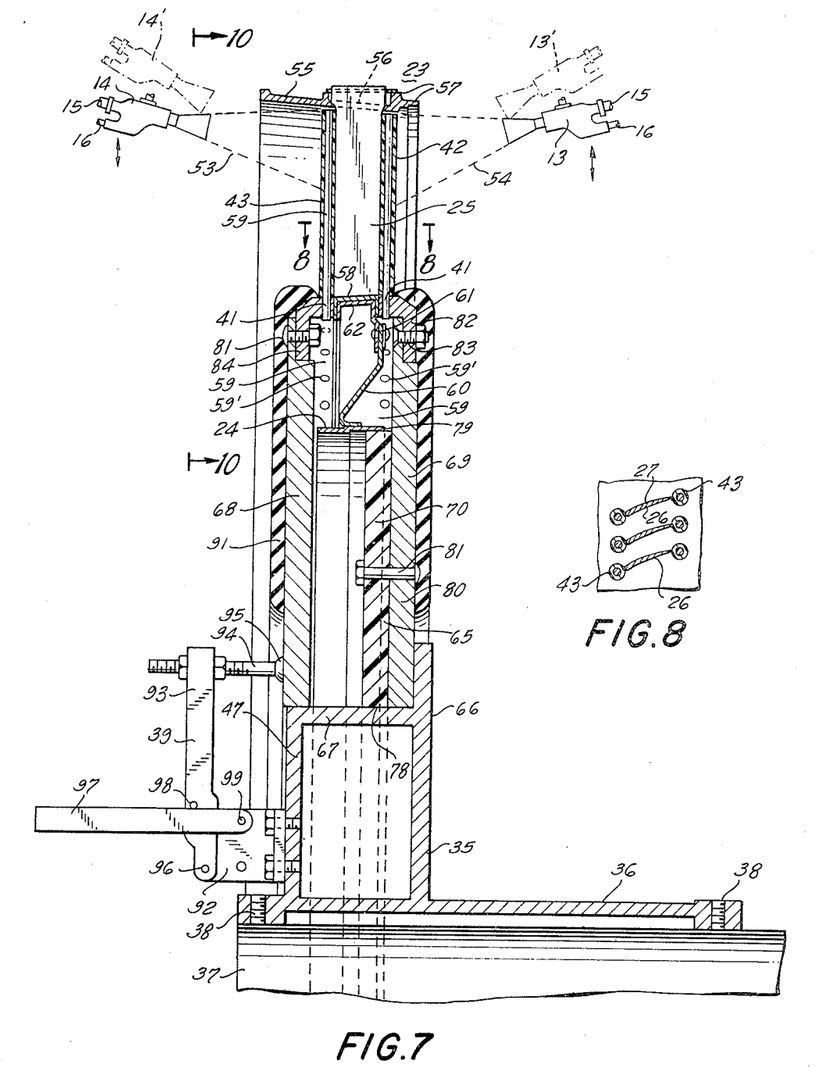
FIG. 7 is a sectional view taken approximately along the section 7—7 of FIG. 1 looking in the direction of the arrows for showing a blade support member carried upon a supporting shaft and arbor and arranged for peening action as depicted by FIG. 1.
FIG. 8 is a section showing several blades protected at their edges by the protective or shrouding structure, such as those of FIG. 4 through FIG. 6, during at least the initial peening operation, the section being taken along the line 8—8 of FIG. 7 looking generally in the direction of the arrows.

If reference is made to the accompanying drawings, the operation may be assumed illustratively to depict the peening of turbine blade elements held between an outer rim and an inner ring and collectively represented by the numeral 11. The blade elements at the time peening occurs are held and supported outwardly of a panel door structure 12 on a supporting shaft and arbor, as shown in the companion concurrently filed application above mentioned. Peening jets, herein schematically represented at 13 and 14, provide a multiplicity of jets projecting relative to one face of the panel 12. The jets are carried upon a reciprocating trestle (not shown) to be reciprocated back and forth across the blade surface while the work is being rotated at either a constant speed or in a stepped fashion. In practice, the jets are usually carried at the ends of nozzle sticks (not shown) which are secured to the reciprocating trestle so that each side of the blade element can be peened. In FIG. 7, the relative movement provided at peening nozzles 13 and 14 when within the field of the turbine blade elements 12 which are to be peened is shown by the jets or nozzles 13' and 14' depicted in dotted outline, as well as by the double ended arrows to indicate jet reciprocation relative to the supported blade elements.

In this showing, it may be assumed, illustratively, that the peening jet elements 13 are arranged to peen the rear or under side of the supported blades, while the jet elements 14 can be assumed as arranged to peen the front or near side of the blade elements. A supply of peening material, such as a slurry formed of a combination of some suitable liquid, such as water, and some peening element, such as generally minute size glass beads or balls of the type already described, is adapted to be directed into the peening nozzles from a suitable source (not shown) under a suitable pressure at each inlet port 15. Some suitable fluid, such as air under pressure, is adapted to be injected into each of the peening nozzles 13 or 14, as the case may be, through an inlet port 16. This fluid is supplied under pressure-control means from a suitable supply source (neither of which is shown). The injected fluid forces the peening slurry (or in the event that a slurry is not used it forces minute size steel or tungsten carbide or equivalent balls of very small size) outwardly from the jet nozzle thereby to impact any component in the ejection path from the forward edge of each nozzle. In this instance, each turbine blade is held between an outer rim 23 and an inner ring 24. In this position, the inner blade surface 26 may be considered as facing toward the panel door surface 12 and the blade outer surface 27 is then facing away from the panel door and would be faced in the direction of an observer looking at FIG. 1, as depicted. One blade edge is adapted to be mounted inwardly toward the ring 24, as schematically represented at 28, whereas the other blade edge which is shown at 29 can be located by the inner ring member 24.

Figure 2:
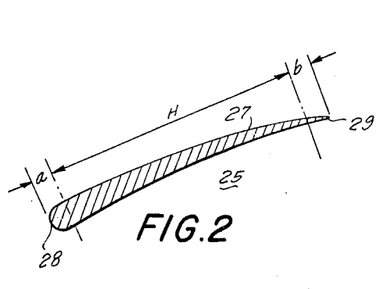
FIG. 2 is a schematic cross-section of a turbine blade with the portions with the spaces (a) and (b) being the regions on which protection is desired during the initial peening operation.
Figure 3:
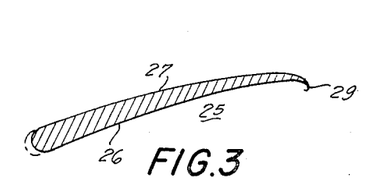
FIG. 3 is another cross-section of a blade following the removal of the protective arrangement showing the erosion of the thicker leading edge of the turbine blade and showing, particularly, the thinning effect and the tendency to curve very slightly the trailing edge; each of FIGS. 2 and 3 is greatly magnified to illustrate principle rather than to be regarded as illustrative of the specific relationship, nor yet even specific blade contour or thickness.

If reference is made now to FIGS. 2 and 3, one portion of the edge 28 of the blade is shown as the region $a$ while the region between the opposite blade edge 29 of the blade surface proper is shown within the region $b$. It is these parts of the blade which are usually protected during the initial stages of the peening operation. As already suggested, this is to prevent the thinner sections of the blade from being subjected to the generally high velocity peening operations which would have the effect of wearing away or eroding these thinner outer edges and bringing them down to a status more nearly approaching a knife edge. This would necessarily reduce the strength of the blade at its edges and would not be of any substantial help in connection with the operation of the device as a whole when finally assembled.

Mention has been made heretofore that the blades are held between an outer rim 23 and an inner ring, such as shown schematically at 24. During the peening operation, the entire assembly is carried outwardly from the panel on an arbor 35 which is shown in more detail in the sectional views of FIGS. 7, 11 and 13. The arbor 35 usually comprises an elongated tubular hub member 36 and associated components. The arbor is supported from the support shaft 37 which extends through the panel 12 and terminates generally at approximately the outer edge of the rim in which the blade is located and supported. The arbor is secured to the support shaft 37 in any desired fashion, such as that schematically illustrated by the set screws 38, to turn with it. The arbor itself supports a quick-release mechanism 39, which will later be described in more detail.

Generally speaking, the arbor 35 has its tubular hub provided with an upstanding guide and support portion 66 on its inner side and a circular end member 47. The circular end member 47 carries a quick-release mechanism 39. The quick-release mechanism supports and positions the shielding or shadowing members, generally designated as 40, relative to the direction from which the jet members can eject the slurry toward the blade so that the projected jet liquid with the small glass beads or balls (or any other form of peening component) is directed against the blade.

Figure 4:
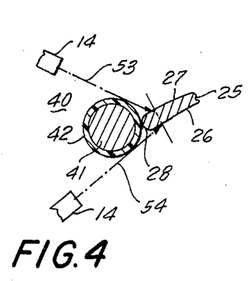
FIG. 4 represents schematically a section through a relatively long metallic rod with a plastic coating adapted to be positioned adjacent to one of the blade edges.

In the showing of FIG. 4, this shielding or shadowing member is depicted generally as a shroud against which the edge of the blade 25 abuts. The shroud is there formed from a metallic tube or rod 41 having a generally thermoplastic resinous or a rubberized coating firmly secured and fastened to its outer edge. This covering 42 is adapted to extend the length of the rod 41 and, as depicted by FIG. 4, provides a shadowing element whereby the output from the peening jet 14 in neither of its extreme positions, or in any position there-between, can strike the outer edge of the blade. Schematically represented, the path of the peening material ejected from the nozzle 14 in either its uppermost or lowermost position is indicated by the dash-dot directional paths 53 and 54 respectively.

Figure 5:
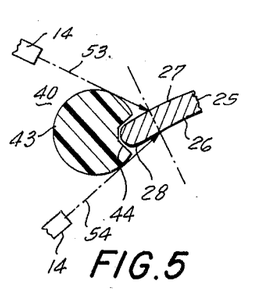
FIG. 5 is an illustration of a section through a form of plastic rod member notched to permit a blade edge to be fitted within the notch for protective purposes during at least a part of the peening operation.

In the modified arrangement of FIG. 5, the shielding, shrouding or shadowing member is formed as a rod of generally thermoplastic material which to the touch feels rather hard and rigid. However, as compared to the hardness of the blade against which the peening components are to be ejected, the rod 43 is soft and absorbs substantially all of the energy of the peening component. After impact on the rod 43, the peening component is permitted to return to some form of return sump (not shown but illustrated in the application already mentioned) in which agitation occurs and from which it may be recirculated by a pumping force.

In order that the blade in either its inner or outer edges may be more firmly positioned relative to the rod element 43, it is usually desirable to form at the side thereof which is to be adjacent to the blade some form of notch element, such as shown at 44. As shown by FIG. 5, the blade fits into such notch. The notch can be of various shapes such as a portion of a circle or it can be generally U-shaped as shown by FIG. 5 or any variation thereof.

Figure 6:
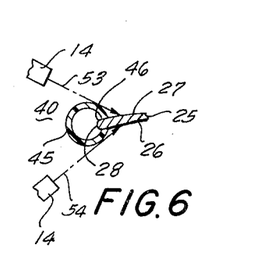
FIG. 6 is a section through a tubular shield means having an elongated slot within which a blade edge similarly may be fitted.

In the modification of FIG. 6, the shielding or shadowing component to protect the blade edge from the initial peening action is represented as a plastic or rubberized tubular element which may have a slot or the equivalent formed in one edge thereof through which the edge of the blade may be positioned. As shown by FIGS. 2 and 3, it is the portions a and b of the blade which are to be protected initially, but eventually and in the finishing operation of the peening, the shielding or shrouding tooling component is removed in the manner to be later explained. Then, if the peening operation is continued, it occurs generally at a lower peening velocity. The significant thing is that the component which is placed adjacent to the edge of the blade should be some form of structure which is not readily penetrated by the peening components. Such structures are those which are softer than the component to be peened, and, as above mentioned, structures which absorb the energy from the peening jet and then after the peening components have struck it have sufficient resilience or elasticity generally to return to their initial shape and at the same time permit the peening elements to return to a supply source or sump for recirculation.

If reference is now made to FIG. 7, the front or outer jet 14 generally ejects its peening components over the path 53. The inner jet or jets 13 ejects its peening components over the path 54. In either event, the shielding or shrouding elements 43 are placed and held along the inner and outer edges of the blade by the suitable form of guiding and arbor structure already mentioned. The blade generally designated as 25 extends through the inner edge 55 of the rim 23 and particularly through various slots 56 which are accurately formed within the rim. The slots are cut or otherwise formed so as to have the correct slope or angle with respect to a normal blade edge as it is held generally radially to the supporting shaft 37. The outer edge of the blade is then suitably fastened into the rim in any desired fashion, such as by welding or upsetting the outer edge to an extent sufficient to preclude its removal.

The internal edge 55 of the rim extends outwardly from one side of the blade and, with the inner edge 57, forms the complete rim component. It will be noted that for ease of mounting the blade and securing it through the slot 56 between the inner and outer edges of the rim 55, 57 that the inner edge is usually formed in a generally L-shaped pattern, thereby to permit the slot to be formed equidistant from the center of the ring irrespective of the slope or angle at which it may be cut into these elements.

The inner edge of the blade is preferably held in a secondary ring 58. An annular ring 59 has suitable openings 59' therein through which the shadowing or protecting elements are inserted thereby to protect the blade edges when the tooling elements are used as blade supports.

The secondary ring 58 is preferably held to the inner ring 24 by a suitable bevel structure 60 attaching to the inner ring 24 by way of a clamping or welding fit 61 which carries a second internal ring member 62 that is fitted adjacent to the secondary ring 58 and provides the support therefor relative to the ring 24. The beveled attaching section 60 is also then preferably welded to the inner ring 24 or otherwise suitably fastened thereto to make a tight fitting structure.

The arbor element 35 has its upstanding edge 66 formed as a generally L-shaped member with the lower portion 67 forming a support for both of the ring members 68 and 69 which are adapted to be positioned on either side of the blade holding rim and ring. The lower portion 67 of the L-shaped member also has its outer diameter of such size that it may support an insulating disk 70 having an internal circular opening 78 corresponding to the outer diameter of the L-section 67 and an outer edge 79 which exactly corresponds to that of the inner edge of the ring 24. In this way, the blade holding outer rim and inner ring may be positioned upon the arbor and supported from the shaft 37 through the arbor, the L-shaped member 66 and its base 67 and the insulating disk 70. The blades, when supported as already described, will then be masked or at least partly shrouded by the protective or shadowing elements 43 which can then be held against the inner and outer edges of the blades when the tooling components are positioned on the arbor. Then, at least for the first portion of the peening operation, the peening components ejected from the nozzles 13 and 14 shall strike only the portion of the blades 25 between the inner boundaries of the sections a and b.

It will be considered that the insulating disk and the L-shaped member 67 are adapted to have a metallic disk element 80 secured thereto by a fastening element, such as the pin and bolt 81. The metallic disk member 80 has its inner opening of a diameter corresponding to the outer diameter of the L-section 67 so as to rest thereupon. Its outer diameter is greater than that of the insulating disk 70 but, as will be noted from FIG. 7, this outer edge extends beyond the periphery of each of the inner ring 24 and the outer edge 79 of the disk 70. Toward the outer edge of the metallic disk 80, an L-shaped bracket 82 is held by a bolt or other suitable fastener 83 to extend inwardly generally toward the openings 59 in the ring 58. The outer surface of the metallic disk 80 is coated preferably with some form of moderately soft thermo-plastic or rubberized material which adheres thereto or which can be fastened thereto by some suitable form of adhesive (not shown) so that any peening component which may be directed from the jet elements 13 down toward the direction of the L-shaped element 82 will be precluded from striking the L-shaped elements which serve as a holding means for the shadowing or protective components 43 which extend between the outer edge of the blade 25 and into the fastening apertures or openings 59 of the ring 58.

In the form in which FIG. 7 has been illustrated, it has been assumed illustratively that the fastening element shall be of the type shown by FIG. 4 with the metal rod central portion 41 extending into the openings 59 and serving as a fastening means adapted to be clamped up against the L-shaped member 82 with the protective covering 42 about the rod interposed between this element and the path of the jet sream from he nozzle 13 in any of its positions. In this form of structure, the L-shaped member 82 presses the rod which is held in the openings 59 tightly in such a way that the rod is supported only from its inner edge and extends outwardly from the ring 24 to a portion adjacent to the edge of the rim 57 but for a distance sufficient to cover the complete edge of the blade structure.

The other edge of the blade is also covered or shielded from the action of the jet 14 by a similar element in the form of the metal rod 41 and it is held by a similar L-shaped fastener 84 which is secured to the ring member 68 in any suitable fashion as by the fastening bolt 85. The outer surface of the ring member 68, like that of the surface 69, is covered for at least that portion which is in the possible range of ejected material from the nozzle or jet 14 with a resilient covering 91 that may be fastened or secured thereto. In each of the showings of FIG. 7, the coverings 81 and 91 are generally exaggerated in thickness for purposes of illustration although these coverings may be of any type of plastic or soft material adapted to be fastened or secured to the ring member thereby to preclude any peening operation occurring on either of the rings 68 or 69.

As was above mentioned, the interior diameter of the ring 68 corresponds precisely to the outer diameter of the L-shaped section 67 of the arbor. At the outer edge of the arbor, a suitable bracket 92 is fastened in any desired manner and from it the quick-release element 39 is suitably pivoted.

The quick-release element 39 comprises a lever 93 which has an adjustable pin 94 terminating in a fastening cup 95 that is adapted to rest against the ring member 68. When the lever 93 is turned in a clockwise direction about its pivot point 96 on the bracket 92 by virtue of the actuating lever 97 against the pin 98, it can be seen that the pin 94 and the fastening cup 95 presses against the ring 68 and thereby forces the ring 68 against the edge of the ring 24. This action, in turn, presses the L-shaped member 84 against the protecting rod extending through the opening 59. This, then, causes a similar action in the opposite side through the insulating disk 70 and the ring 69 thereby to hold these elements in the desired position. Whenever it is desired to release the components following any desired period of peening action through the jets 13 and 14, the lever 97 is turned in a counter-clockwise direction about its pivot point 99 and immediately the pin 94 and its holding cup is released from the ring 68. This then permits the ring to be manually removed from the edge of the ring 24.

Similarly, by reason of the release of pressure, the ring 69 is removed from the opposite edge of the ring 24 with the insulating member 70 withdrawn therefrom. As soon as this release occurs, it is of course apparent that the protective or shadowing members 41 and 42 and the rods 41 which extend into the openings 59 in the ring 58 may be withdrawn and the blade then held and positioned adjacent to the rim 58 and fastened at its outer edge 56. At this time, if it is desired to continue the peening operation, the peening material ejected from the jets 13 and 14 are adapted to strike the full surface of the blade and cover not only that blade section between the regions $a$ and $b$ but also to cover the regions $a$ and $b$ as well. With the arbor keyed to the shaft 37, it is apparent that any rotation of the shaft 37 will carry with it the complete arbor and all of the quick-release support elements for holding the blades in a protected position relative to the jet and supporting them with respect to the internal ring as they are supported from their outer edge at 56.

Figure 9:
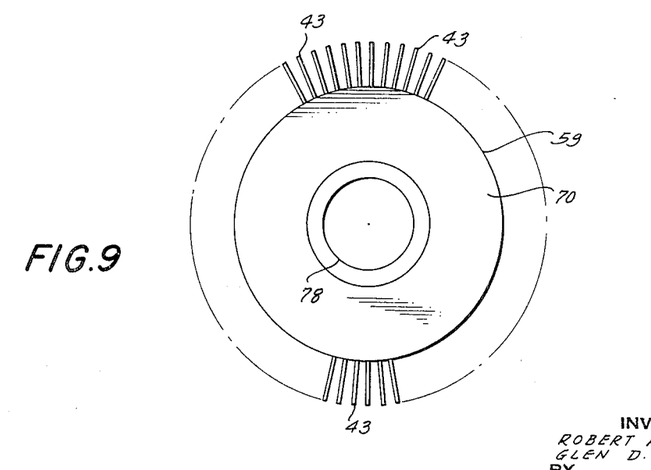
FIG. 9 is a general plan view of a part of the tooling used particularly in the protection of the edges of large blade elements during the initial peening operation, which blade elements are shown more particularly by FIG. 13, with the tooling adapted to be held adjacent to an arbor, as in FIG. 13.
Figure 10:
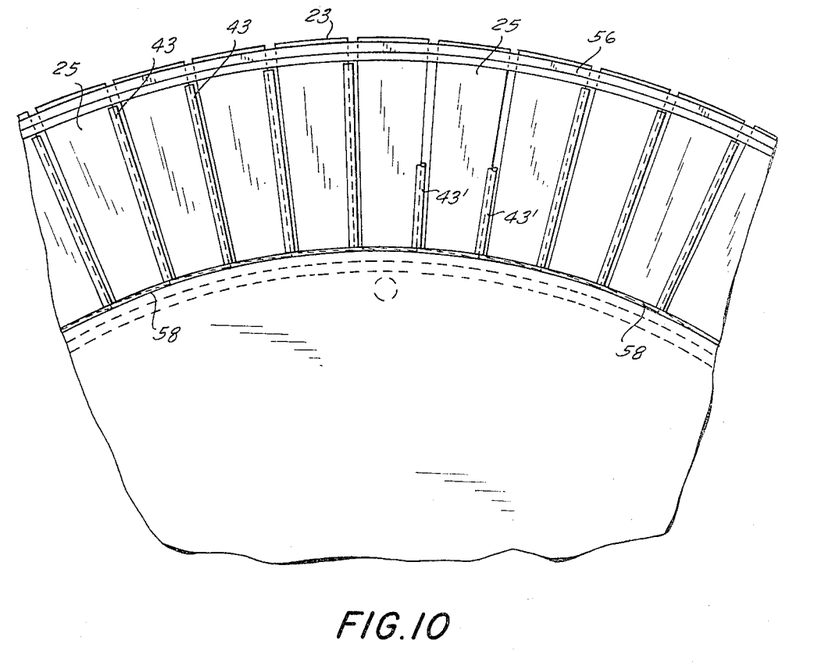
FIG. 10 is an enlarged view of a portion or section of the tooling structure for supporting the blade protective elements along the blade edge during at least the initial stages of the peening operation with the blade positioned adjacent to the tooling.

Referring particularly now to FIGS. 9 and 10, the protective rods 43 extending outwardly from the peripheral edge of the angular ring 59 are shown generally in plan. The protective rods 43 extend outwardly from the insulating disk member 70. The insulating disk member, as shown, is arranged for support upon the lower part 67 of the L-shaped portion of the arbor 35 (see FIG. 7) and thus constitutes a part of the tooling for the operation.

In FIG. 10, these protective rods 43 are shown slightly in enlarged scale and, as designated at 43', certain of the rods are broken off to show their relationship relative to the blade members 25 against which they abut. The blade members 25 in FIG. 10 are shown as extending through the slots or apertures 56 in the rim member 23. The blades, as they extend through the slots 56, then are preferably upset or hammered over their edges to hold them in the indicated positions. At their inner edge, these blades rest against and are held by the secondary ring 58 to which they are positioned as indicated more particularly by FIG. 7.

In the form shown, the insulating disk 70, like the disk 68, is fitted over the L-shaped end 67 of the arbor 35. When so positioned the insulating disk 70 holds all of the components in the desired relationship one with respect to the other and with respect to the jets 13 and 14 from which the peening material is ejected. At times, when it is desirable to peen the inner and outer edges of the blades 26, the ring members 68 and 69 may be removed, in which event it is often desirable that the fastening element 81 be loosened so that the insulating disk 70 may remain positioned upon the lower portion 67 of the L-shaped portion of the arbor 35 and thereby hold the outer edge 79 of the ring 24 in order that the blades and the outer ring may be positioned for rotation and peening action.

During the course of the peening action, as indicated by FIG. 8, when the assembly is in the arrangement shown in FIG. 7, the inner and outer edges of the blades are protected by the members 43. At times, when the quick-release mechanism 97 is operated and the insulating elements and, with them, the ring 59 is removed from the blade, the blade edges are freely within the range of any peening nozzle components 13 and 14 directed from any of the jet elements.

Figures 11, 12:
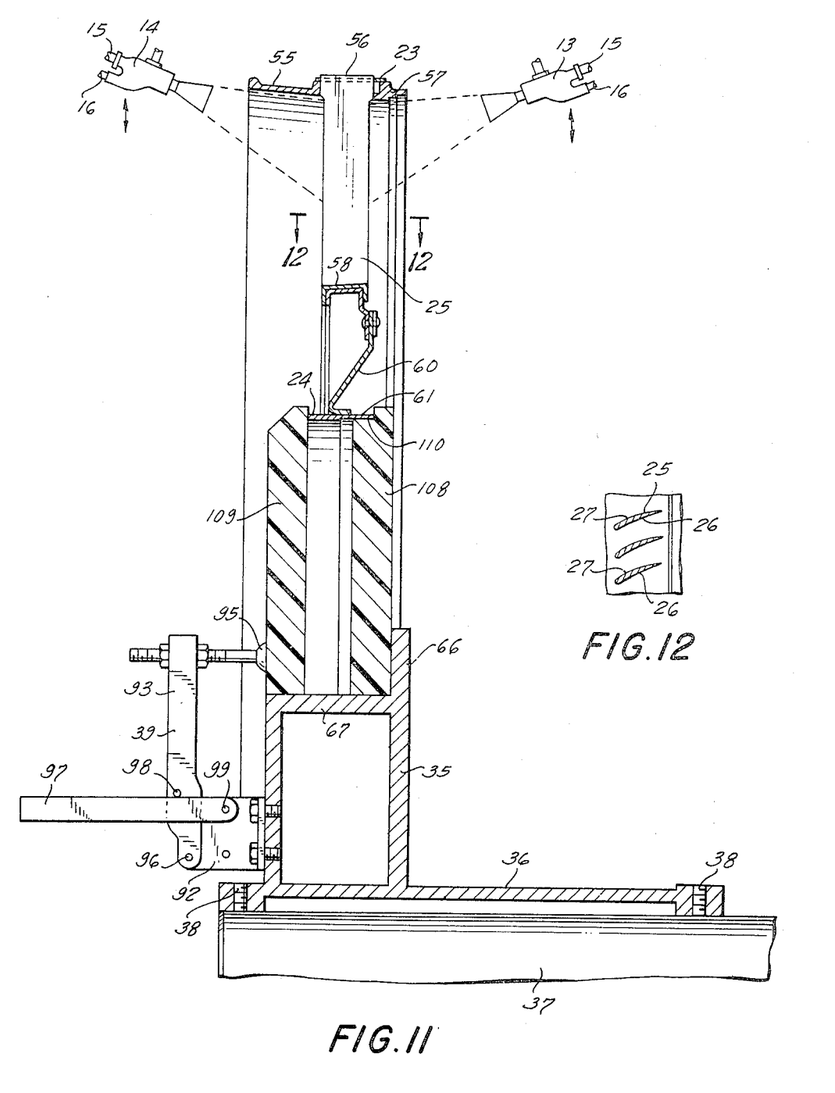
FIG. 11 is a view somewhat similar to FIG. 7 with the protective or shadowing shields or shrouding members removed from the arbor structure to permit edge peening of the blades suppoted from the inner ring and the shaft and arbor as shown by FIG. 1.
FIG. 12 is a section taken along the line 12—12 of FIG. 11 looking in the direction of the arrows to show three of the finished blades after having had their edges subjected to peening, these blades forming a part of a stator element.

This construction is shown more particularly by FIG. 11 where the same quick-release mechanism may be utilized. If desired, the insulating disk 70 may be replaced by a similar insulating disk 108 and the disk 68 replaced by a disk 109, with the ring element 24 rested upon a shoulder 110 of the disk 108 and the disk 109 being adapted to be brought against the edge of the ring 24 by the action of the quick-release element 39. The quick-release element is of the same form already explained particularly with respect to FIG. 7 and will not be further discussed except to point out that in the arrangement of FIG. 11 where the edges of the blade 25 are to be peened, the cup member 95 will rest against the disk 109 and its position will be established similarly by movement of the handle element 97 which is carried and pivoted about the point 99 on the bracket 92 attached to the arbor structure. The components already described are present and when the peening of the edges is achieved, the general appearance of the structure will be as schematically represented by the sectional view of FIG. 12 showing a few of the completed blade elements 25 after the upper and lower sides 26 and 27, respectively, have been exposed to the action of the jets 13 and 14. Otherwise, except for the absence of the shielding means, the general manner of supporting the rings from the arbor is relatively similar to that of FIG. 7.

FIG. 13 shows, again, a generally similar structure with the quick-release member identical to that diagrammed in FIGS. 7 and 11. Because of the fact that the FIG. 13 structure deals with longer blade elements 25, the protective rods or components 43 are arranged to extend within and to be wedged between apertures in the ring members 58' and the disk edge 111 or 112 as the case may be. In this instance, the protective element is to be of the form depicted by FIG. 5. Otherwise the overall arrangement corresponds to that shown in section in FIG. 14. The protective or shrouding rods extend through the apertures in the elements 111 and 112 which, in turn, are protected by an outer coating of soft resinous or rubberized material 113 or 114 secured to the outer surface of the elements 111 and 112. The inner ring member 61', which supports the blades as a whole, is carried upon an insulating member 115 which is in the form of an angular ring which has an internal opening corresponding to that of the outer periphery of the lower part 67 of the L-shaped member 66. These members are assembled in any desired fashion and held upon the arbor during the peening operation.

Figures 13, 14:
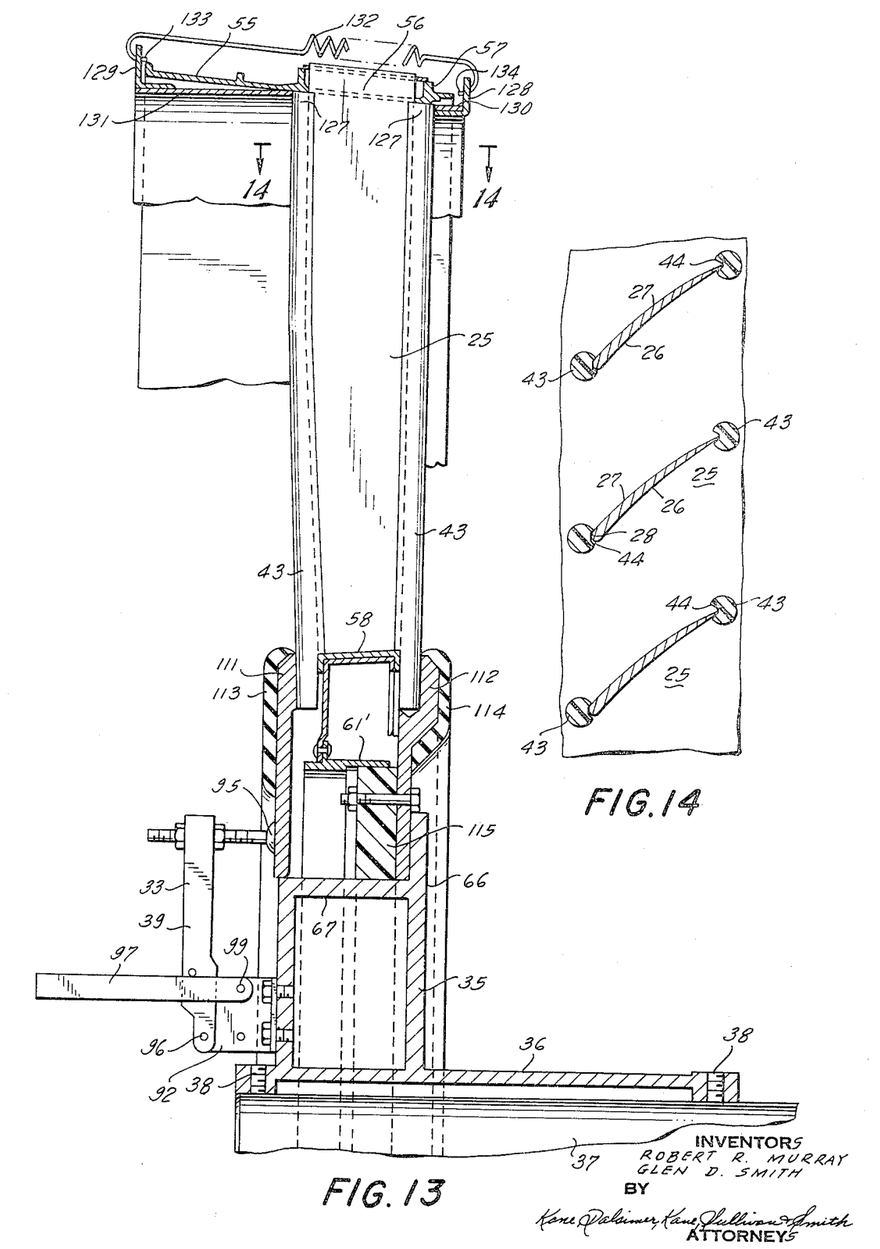
FIG. 13 is a view in some respects similar to FIG. 7 but intended to show a substantially larger size supported blade and a modified tooling structure for protecting the edges of the blades during at least the initial peening operation and illustrating particularly the quick release mechanism for holding the blade protective elements at their inner and outer ends.
FIG. 14 is a sectional view taken substantially along the path 14—14 of FIG. 13 looking in the direction of the arrows to show several large blade elements in their initial positioning for peening under a high velocity peening jet.

At the time the peening operation is completed, the angular insulating member 115 is released concurrently with the release of the quick-release mechanism 39 and then by a release of the set screws 38 which fasten the hub 36 of the arbor to the shaft 37, the stator element and its rims with the blades. At the time the elongated shielding members 43 are held in position as indicated by FIG. 13, the end of the blade 25 protrudes through the slot 56 (as explained in connection with FIG. 7). Similarly, the inner edge of the blade is rested against the secondary ring 58 and is similarly fastened. The rim is provided with an inner edge 57 also similar to FIG. 7 and an outer edge 55. When the outer ends 127 of the protective shrouds 43 are elongated as shown by FIG. 13 and the section 14, it is desirable that some provision be made whereby they shall be held free from vibration. To this end, it is usually desirable to provide a pair of bracket elements such as the L-shaped brackets 128 and 129 at either side of the protective elements 43. The L-shaped brackets have flattened plate members 130 and 131 attached thereto which extend from the L-shaped brackets inwardly to a position where they abut the outer end of the elements 43. These brackets are positioned from either side of the rim and just internally of the rim and then are held tightly in position by means of a spring member or the equivalent 132, the ends of which are shown at 133 and 134 which extend through small openings in the L-shaped bracket. At the time it is desired to release the shrouds from the edges of the blades 25, whether the edges be the front or the rear or both, one end of the spring as at 133 is released and this, in turn, releases the force exerted on the opposite end so that the brackets 128 and 129, together with the flattened circular sections 130 and 131 may be freed from contact with the outer edge of the protective elements. With this being done, it is apparent that the complete assembly may be readily separated. The shielding members form a part of the protective elements and, therefore, are assembled initially adjacent to the disk and blade edges. At the time the peening of the blade is complete, except for the edge peening, the quick-release mechanism is unlatched thereby to release the disk section 111. Similarly, at this time, the set screws 38 on the arbor mechanism can be released and by sliding the arbor slightly to the right in the position shown or by retaining the arbor in its position and opening the quick-release mechanism, the blade section in its support upon the outer and inner rims can be moved to the left and lifted off the support shaft and the retaining position thereby to allocate it to a position from which the peening operation of the edge section can be continued.

The illustration of FIGS. 13 and 14 thus shows the applicability of the shielding elements to different size blades and to different length blades. The invention broadly covers each form of structure.

In the foregoing papers and description, reference has been made to peening by way of supplying a slurry as the peening material. It is, however, to be understood that in many instances the peening can be achieved without the slurry and by feeding the peening components such as the hardened steel balls of various sizes or even glass beads of various sizes through the peening component in the form of a nozzle.

In many instances, the shot flow can be gravitational or in other instances can be under a pressure generating system which is more in accordance with the form in which it is used when in a slurry. Various shot hardness and shot compliance, of course, may be adapted to provide for various conditions of the operation. Likewise, the angle of the nozzle with respect to the horizontal as well as the distance from the surface to be peened can be varied within suitable limits. In a pressure generator system, the pressure at which the shot is directed toward the surface of the article can be varied through relatively wide limits and this would also be true with respect to the gravity flow systems.

In summary, it might be pointed out that the invention as described offers a greatly improved means of making the leading and trailing edges of the blades and vanes of turbine equipment by avoiding any rolling or distortion of the delicate surfaces at the edges while at the same time it provides a means of peening these surfaces to obtain greatly extended fatigue characteristics. The invention, of course, can be modified within wide limits without departing in any respect either from the spirit or scope of what is herein set forth. Therefore, the claims are to be interpreted broadly in the light of the inventive scope of this disclosure.

Having now described the invention, what is claimed is:

1. A protective component means for shielding the edges of turbine blades from the action of peening jets which comprises
blade shielding means of pliable material and means for supporting the shielding means in the path between the peening jet means and the blades to be peened so that any blade edge is positioned in a shadowed relationship to the field of the peening jet means.

2. The component means as claimed in claim 1 wherein the shielding means comprises
metal rod means having a pliable covering thereon, and
means to support the metal rod means at each end relative to the blades to be peened.

3. The component means as claimed in claim 1 wherein the shielding means comprises
pliable rod means each having a recess into which one edge of each blade adapted to be peened is adapted to fit, and
means to support the pliable rod means at each end relative to the blade to be peened.

4. The component means as claimed in claim 1 wherein the shielding means comprises
tubular pliable means having a recess through which a blade edge is adapted to be projected into the tube, and
means to support the tube at each end relative to each blade to be peened.

5. The component means claimed in claim 2 comprising, in addition,
means to support the rod means at each of its ends with all portions thereof between the ends substantially in contact with at least one blade edge.

6. The component means claimed in claim 4 comprising, in addition,
means to support the tubular means at each of its ends with portions thereof between the ends substantially in contact with at least one blade edge.

7. The component means claimed in claim 1 comprising, in addition,
means to support rod means adjacent to each of the front and rear edges of the blade during at least a portion of the peening operation.

8. The component means claimed in claim 6 comprising, in addition,
means to support the tubular means adjacent to each of the front and rear edges of the blade during at least a portion of the peening operation.

9. Apparatus for peening turbine blades from a multiplicity of peening nozzles supported at opposite sides of the blades comprising
a rim for supporting the blades with selected peripheral spacing so that each blade occupies a generally radial position relative to the rim center and extends inwardly toward the rim center for a pre-selected distance,
means for supporting each blade by means substantially adjacent to the inner surface portion of the rim,
an internal ring-like member within the rim adapted to be located within the rim boundary,
means to secure each blade at its inner edge substantially along the ring-like member, and
means to support a protective shielding element along the front and rear edge of each blade during the major portion of the time period when the rim is in the region of any peening nozzle.

10. The combination claimed in claim 9 comprising, in addition,
an arbor for supporting the inner ring, the turbine blades and the outer rim for rotation.

11. The apparatus claimed in claim 10 comprising, in addition,
disk-like member supported from the arbor for temporarily securing the blade shielding means to the blade edge during blade peening periods.

12. The apparatus claimed in claim 11 comprising, in addition,
a ring member adapted to be supported upon the turbine rim during blade peening periods, and
means for releasably holding the blade protecting means from the ring member adjacent to the blade edges.

13. The apparatus claimed in claim 12 comprising, in addition,
quick release means for releasing all blade protecting means at their inner edge substantially simultaneously.

14. The apparatus claimed in claim 11 comprising, in addition,
resilient means for clamping the outer edge of the blade protecting means to the blade edges.

15. The apparatus claimed in claim 11 comprising, in addition,
means for supporting the rim and its inner ring and the blade secured thereto free from the protective means whereby in the absence of protective means the outer edges of the blades may be peened.

16. A structure adapted for peening turbine blades comprising
a planar surface,
arbor means protruding from the planar surface for supporting a turbine element comprising
a plurality of substantially radially positioned blade members supported at one end in an outer rim and at the other end in an inner ring,
means for releasably positioning a shroud element at the leading and following edge of each blade in the region between the outer rim and the inner ring, whereby all of the central portions of the blade may be peened by the jet nozzles, and
means for releasing the shroud from each edge of the blade for subsequently peening the complete blade.

References Cited

UNITED STATES PATENTS

| 2,277,937 | 3/1942 | Shryer | 51—310 |
| 2,617,225 | 11/1952 | O'brien | 51—310 |
| 2,881,506 | 4/1959 | Fuchs | 72—53 |

CHARLES W. LANHAM, Primary Examiner

GENE P. CROSBY, Assistant Examiner

U.S. Cl. X.R.

51—310, 319